(12) United States Patent
Aleabe Al-Imari

(10) Patent No.: US 11,563,529 B2
(45) Date of Patent: Jan. 24, 2023

(54) METHOD AND APPARATUS FOR OUT-OF-ORDER HYBRID AUTOMATIC REPEAT REQUEST FEEDBACK IN MOBILE COMMUNICATIONS

(71) Applicant: MediaTek Singapore Pte. Ltd., Singapore (SG)

(72) Inventor: Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 226 days.

(21) Appl. No.: 17/062,628

(22) Filed: Oct. 4, 2020

(65) Prior Publication Data
US 2021/0143944 A1 May 13, 2021

Related U.S. Application Data

(60) Provisional application No. 62/932,559, filed on Nov. 8, 2019.

(51) Int. Cl.
*H04L 1/18* (2006.01)
*H04W 72/10* (2009.01)
*H04W 72/12* (2009.01)

(52) U.S. Cl.
CPC .......... *H04L 1/1887* (2013.01); *H04L 1/1812* (2013.01); *H04W 72/10* (2013.01); *H04W 72/1278* (2013.01)

(58) Field of Classification Search
CPC ................ H04W 28/04; H04W 72/04; H04W 72/042; H04W 88/08; H04W 72/10; H04W 72/045; H04L 5/0007; H04L 1/1812; H04L 1/1887; H04L 1/1832; H04L 5/0055

USPC .......................................................... 370/329
See application file for complete search history.

(56) References Cited

U.S. PATENT DOCUMENTS

| 2012/0106478 A1* | 5/2012 | Han ...................... H04W 52/58 370/329 |
| 2013/0242910 A1* | 9/2013 | Fu .......................... H04L 1/1864 370/329 |
| 2016/0065349 A1* | 3/2016 | Papasakellariou .. H04W 52/146 370/329 |

(Continued)

FOREIGN PATENT DOCUMENTS

JP   WO 2021/023534 A1 * 2/2021 ............... H04L 1/18

OTHER PUBLICATIONS

5G NR Hybrid ARQ, Jul. 2020, Release 16. (Year: 2020).*

*Primary Examiner* — Peter G Solinsky
*Assistant Examiner* — Sanjay K Dewan
(74) *Attorney, Agent, or Firm* — Han IP PLLC; Andy M. Han

(57) ABSTRACT

Various solutions for supporting out-of-order hybrid automatic repeat request (HARQ) feedback with respect to user equipment and network apparatus in mobile communications are described. An apparatus may construct a first HARQ-ACK codebook corresponding to a first physical downlink shared channel (PDSCH) and construct a second HARQ-ACK codebook corresponding to a second PDSCH received later than the first PDSCH. The apparatus may activating an out-of-order HARQ transmission to transmit the first HARQ-ACK codebook and the second HARQ-ACK codebook in an event that the priorities associated with the codebooks are different.

18 Claims, 5 Drawing Sheets

(56) References Cited

U.S. PATENT DOCUMENTS

| | | | |
|---|---|---|---|
| 2019/0149271 A1* | 5/2019 | Yin | H04W 88/023 |
| | | | 370/329 |
| 2019/0149275 A1* | 5/2019 | He | H04L 1/0061 |
| | | | 370/329 |
| 2019/0306923 A1* | 10/2019 | Xiong | H04L 5/0051 |
| 2020/0053766 A1* | 2/2020 | Chien | H04L 1/1854 |
| 2020/0177323 A1* | 6/2020 | Fakoorian | H04W 72/042 |
| 2020/0259896 A1* | 8/2020 | Sachs | H04W 12/06 |
| 2020/0314900 A1* | 10/2020 | Hosseini | H04W 72/10 |
| 2021/0135946 A1* | 5/2021 | Babaei | H04L 1/1812 |
| 2022/0038244 A1* | 2/2022 | Zhang | H04L 1/1671 |

* cited by examiner

METHOD AND APPARATUS FOR OUT-OF-ORDER HYBRID AUTOMATIC REPEAT REQUEST FEEDBACK IN MOBILE COMMUNICATIONS

CROSS REFERENCE TO RELATED PATENT APPLICATION(S)

The present disclosure is part of a non-provisional application claiming the priority benefit of U.S. Patent Application No. 62/932,559, filed on 8 Nov. 2019, the content of which being incorporated by reference in its entirety.

TECHNICAL FIELD

The present disclosure is generally related to mobile communications and, more particularly, to out-of-order hybrid automatic repeat request (HARQ) feedback with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability and robustness. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission.

In NR Release-15, there is a restriction on the order between the scheduled PDSCHs and their corresponding HARQ feedback. Such restriction could be described as "in a given scheduled cell, the UE is not expected to receive a first PDSCH in slot i, with the corresponding HARQ-ACK assigned to be transmitted in slot j, and a second PDSCH starting later than the first PDSCH with its corresponding HARQ-ACK assigned to be transmitted in a slot before slot j". Thus, in NR Release-15, out-of-order HARQ feedback is not supported. This restriction could be reasonable when a single service type is deployed.

However, the current framework of transmission of HARQ feedback bits is not suitable for ultra-reliable and low latency communications (URLLC). URLLC is introduced for emerging applications that demands high requirements on end-to-end latency and reliability. Different reliability aspects required for different service types are also variant. In spectral efficiency, URLLC HARQ feedback may require more physical resource block (PRB) allocation for reliability whereas Enhanced Mobile Broadband (eMBB) HARQ feedback is likely to require narrower frequency-domain allocation. Therefore, the out-of-order HARQ restriction is not suitable when different service types are deployed simultaneously.

Accordingly, how to design a new HARQ feedback mechanism to satisfy different performance requirements for different service types is an important issue in the newly developed wireless communication network. Therefore, there is a need to provide proper HARQ feedback design to support out-of-order HARQ feedback for better performance when different service types are supported.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to out-of-order HARQ feedback design with respect to user equipment and network apparatus in mobile communications.

In one aspect, a method may involve an apparatus constructing a first HARQ-ACK codebook corresponding to a first PDSCH. The method may also involve the apparatus constructing a second HARQ-ACK codebook corresponding to a second PDSCH received later than the first PDSCH. The method may further involve the apparatus determining whether a first priority associated with the first HARQ-ACK codebook and a second priority associated with the second HARQ-ACK codebook are different. The method may further involve the apparatus activating an out-of-order HARQ transmission to transmit the first HARQ-ACK codebook and the second HARQ-ACK codebook in an event that the first priority and the second priority are different.

In another aspect, an apparatus may comprise a transceiver which, during operation, wirelessly communicates with a network node of a wireless network. The apparatus may also comprise a processor communicatively coupled to the transceiver. The processor, during operation, may perform operations comprising constructing a first HARQ-ACK codebook corresponding to a first PDSCH. The processor may also perform operations comprising constructing a second HARQ-ACK codebook corresponding to a second PDSCH received later than the first PDSCH. The processor may further perform operations comprising determining whether a first priority associated with the first HARQ-ACK codebook and a second priority associated with the second HARQ-ACK codebook are different. The processor may further perform operations comprising activating an out-of-order HARQ transmission to transmit the first HARQ-ACK codebook and the second HARQ-ACK codebook in an event that the first priority and the second priority are different.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to out-of-order HARQ feedback with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, HARQ-ACK information transmission is introduced to improve transmission reliability and robustness. The UE needs to report HARQ-ACK information for corresponding downlink receptions in a HARQ-ACK codebook. The HARQ-ACK codebook should be transmitted in a slot indicated by a value of a HARQ feedback timing indicator field in a corresponding DCI format. The DCI format should also indicate the PUCCH resource scheduled for the HARQ-ACK information transmission. HARQ-ACK multiplexing can be used to facilitate HARQ-ACK information transmission. Multiple HARQ-ACK feedbacks corresponding to multiple PDSCH transmissions may be accumulated, multiplexed and transmitted to the network apparatus at once. One PUCCH resource may be used to carry multiple HARQ-ACK feedbacks to be transmitted in the same slot.

Figure 1:
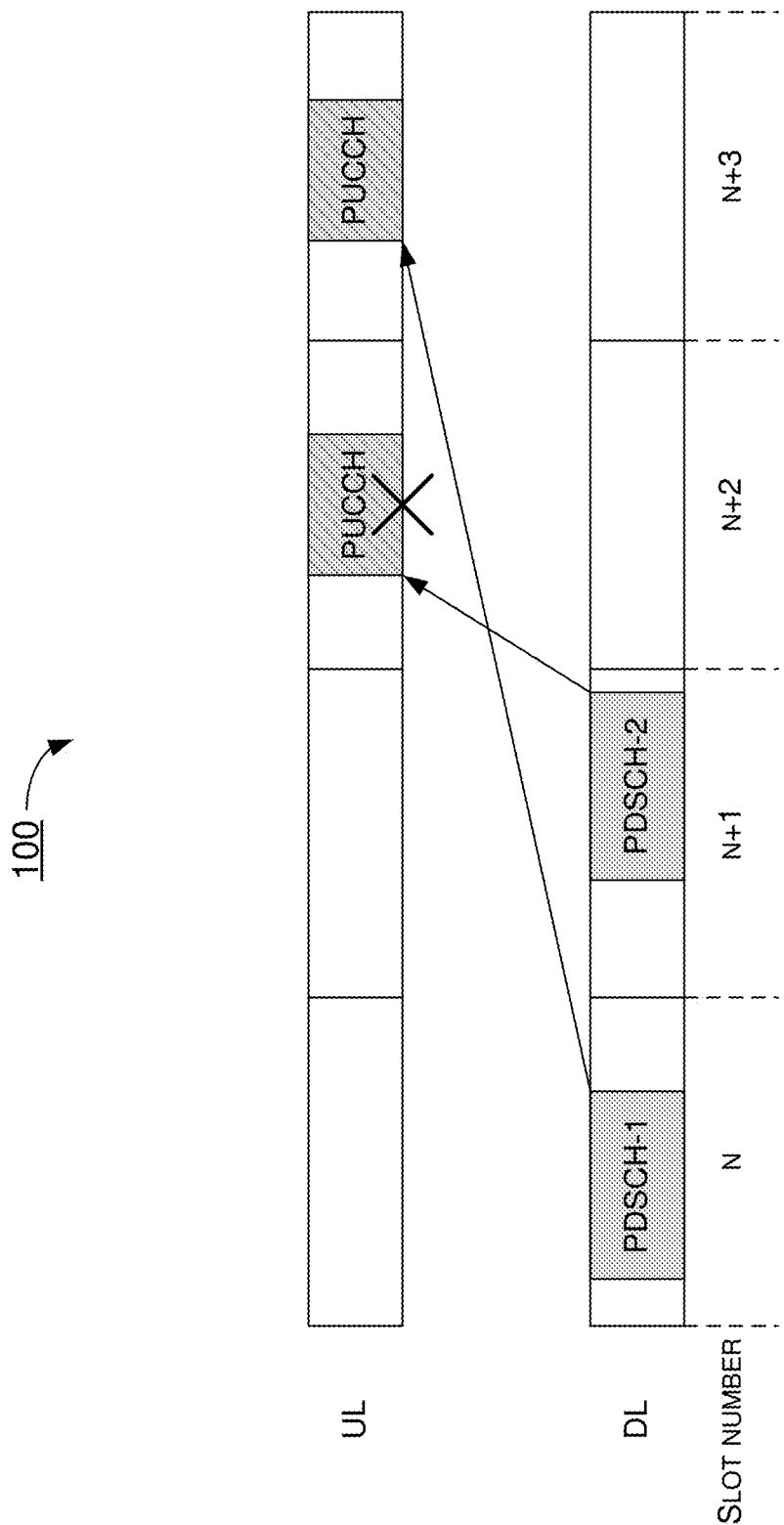
FIG. 1 is a diagram depicting an example scenario of out-of-order HARQ restriction in accordance with implementations of the present disclosure.

In NR Release-15, there is a restriction on the order between the scheduled PDSCHs and their corresponding HARQ feedback. FIG. 1 illustrates an example scenario 100 of out-of-order HARQ restriction in accordance with implementations of the present disclosure. Scenario 100 involves a UE and a network node, which may be a part of a wireless communication network (e.g., an LTE network, a 5G network, an NR network, an IoT network or an NB-IoT network). The UE may be configured to receive a physical downlink control channel (PDCCH) and a scheduled PDSCH. The UE may further be configured with a PUCCH resource for transmitting the HARQ feedback corresponding to the schedule PDSCH. As an example of the restriction, as shown in FIG. 1, the network node is not allowed to request HARQ feedback for PDSCH-2 before the HARQ feedback of PDSCH-1. Such restriction could be described as "in a given scheduled cell, the UE is not expected to receive a first PDSCH in slot i, with the corresponding HARQ-ACK assigned to be transmitted in slot j, and a second PDSCH starting later than the first PDSCH with its corresponding HARQ-ACK assigned to be transmitted in a slot before slot j". Thus, in NR Release-15, out-of-order HARQ feedback is not supported. This restriction could be reasonable when a single service type is deployed.

On the other hand, the current framework of transmission of HARQ feedback bits is not suitable for URLLC. URLLC is introduced for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, using only one PUCCH resource for HARQ feedback bits transmission in an uplink slot will add to transmission latency. Different reliability aspects required for different service types are also variant. In spectral efficiency, URLLC HARQ feedback may require more PRB allocation for reliability whereas eMBB HARQ feedback is likely to require narrower frequency-domain allocation.

Therefore, NR Release-16 supports up to two HARQ-ACK codebooks with different priorities to be simultaneously constructed. The main motivation to construct two HARQ-ACK codebooks simultaneously is to support two types of services at the UE, where each service requires different quality of service (QoS) requirements such as latency and/or reliability. For example, if there are eMBB and URLLC services running at the UE, one HARQ-ACK codebook could be used for the HARQ feedback of the packets related to the eMBB service, and another codebook could be used for the HARQ feedback of the packets related to the URLLC service. The eMBB codebook could be slot-based, while the URLLC codebook could be sub-slot based.

Figure 2:
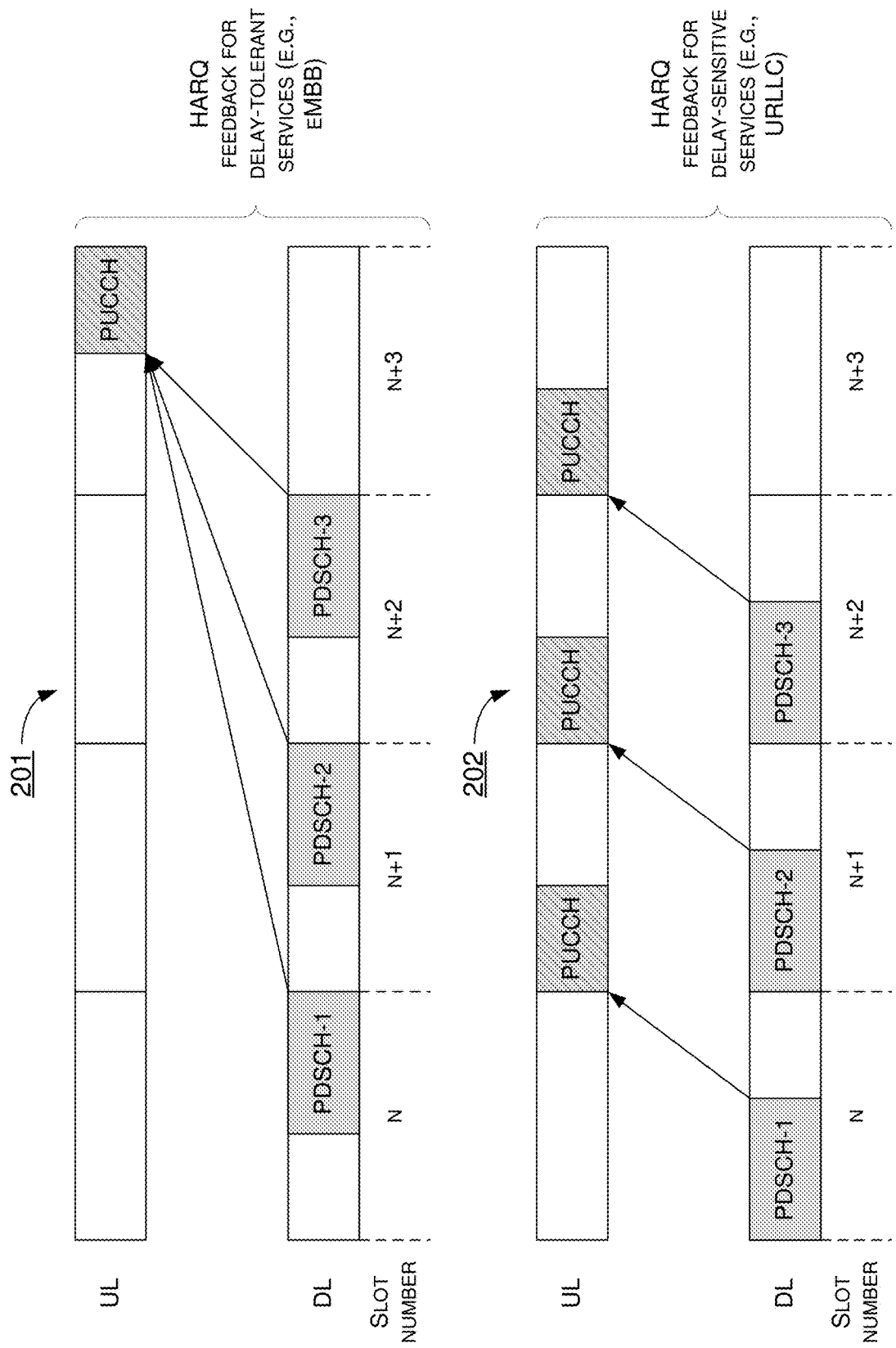
FIG. 2 is a diagram depicting example scenarios under schemes in accordance with implementations of the present disclosure.

FIG. 2 illustrates example scenarios 201 and 202 under schemes in accordance with implementations of the present disclosure. Scenarios 201 and 202 involve a UE and a network node, which may be a part of a wireless communication network (e.g., an LTE network, a 5G network, an NR network, an IoT network or an NB-IoT network). The HARQ feedback for the different codebooks (e.g., different services) could be operated differently based on the service requirements. For example, for delay-tolerant services such as eMBB, the network node will build "large" HARQ-feedback codebooks, where multiple downlink transport blocks are acknowledged within one codebook. As shown in scenario 201, the HARQ-ACKs of PDSCH-1, PDSCH-2 and PDSCH-3 can be multiplexed in one HARQ-ACK codebook and transmitted in one PUCCH. On the other hand, for delay-sensitive services such as URLLC, the network node will request the HARQ feedback as soon as possible. As shown in scenario 202, the HARQ-ACKs of PDSCH-1, PDSCH-2 and PDSCH-3 are transmitted separately in a closest PUCCH. Delaying the URLLC's HARQ feedback until the earlier PDSCH has been acknowledged, could result in missing the opportunity for any possible retransmission. As a consequence, the network will have to rely on single-shot transmission, which is not spectrally efficient.

In view of the above, the present disclosure proposes a number of schemes pertaining to out-of-order HARQ feedback with respect to the UE and the network apparatus. According to the schemes of the present disclosure, methods and apparatus for supporting out-of-order HARQ feedback between HARQ-ACK codebooks with different priorities are provided. The UE may be configured to construct multiple codebooks simultaneously that are associated with different priorities. The out-of-order HARQ restriction may be applied within the HARQ-ACK codebooks of the same priority. The HARQ-ACK feedback of HARQ-ACK codebooks with different priorities may be transmitted in an out-of-order manner. Accordingly, the HARQ-ACK codebooks corresponding to different priorities/service types can be properly transmitted. The performance requirements (e.g., latency/reliability) for delay-sensitive services may be satisfied while spectrum/transmission efficiency for delay-tolerant services may also be achieved.

Figure 3:
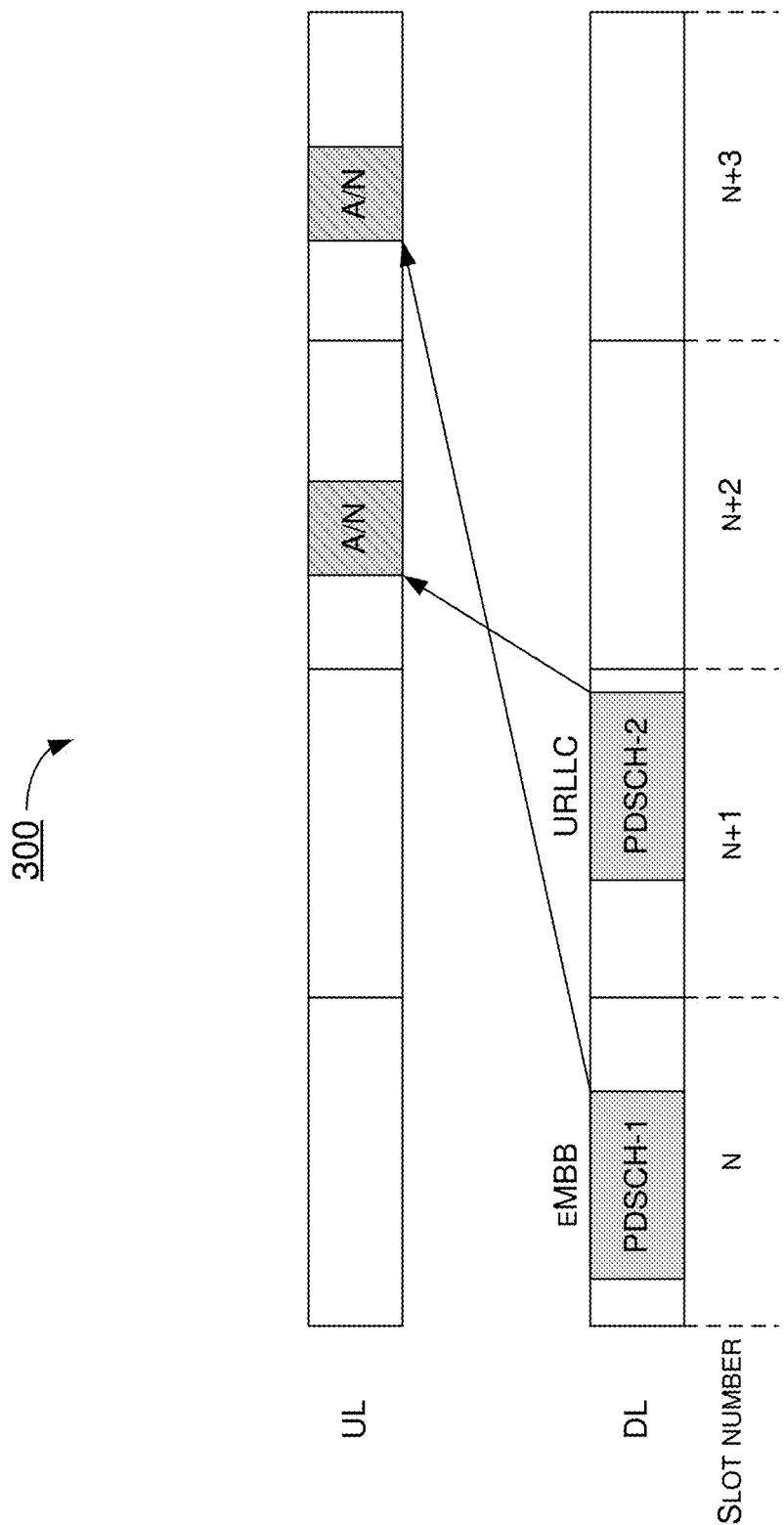
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, a 5G network, an NR network, an IoT network or an NB-IoT network). In scenario 300, out-of-order HARQ between HARQ-ACK codebooks with different priorities is supported. For a UE that supports traffic types with different priorities, the downlink traffic for URLLC might arrive in-between an eMBB PDSCH and the associated HARQ feedback (e.g., acknowledgement (ACK)/negative acknowledgement (NACK)). Given the low latency requirements for URLLC traffic, the HARQ feedback needs to be transmitted with short delay to enable possible HARQ retransmission. Thus, this could result in an out-of-order HARQ feedback as illustrated in FIG. 3.

Specifically, the UE may receive a first PDSCH (e.g., PDSCH-1) in slot n and may be configured with a first PUCCH in slot n+3 for transmitting the HARQ feedback (e.g., A/N) corresponding to the first PDSCH. The UE receive a second PDSCH (e.g., PDSCH-2) in slot n+1 and may be configured with a second PUCCH in slot n+2 for transmitting the HARQ feedback (e.g., A/N) corresponding to the second PDSCH. The UE may be configured to construct/generate a first HARQ-ACK codebook corresponding to the first PDSCH. The UE may be configured to construct/generate a second HARQ-ACK codebook corresponding to the second PDSCH received later than the first PDSCH. Then, the UE may be configured to determine a first priority associated with the first HARQ-ACK codebook and a second priority associated with the second HARQ-ACK codebook. The first PDSCH and the second PDSCH may be associated with different service types. For example, the first PDSCH may belong to the eMBB services and the second PDSCH may belong to the URLLC services. The UE may determine that the second priority is higher than the first priority according to the service types. The UE may also determine the first priority and the second priority according to an indication from the network node. The indication may be comprised in a downlink control information (DCI) or a higher layer signaling (e.g., radio resource control (RRC) signaling).

The UE may be configured to determine whether the first priority associated with the first HARQ-ACK codebook and the second priority associated with the second HARQ-ACK codebook are different. In an event that the first priority and the second priority are different, the UE may be configured to activate an out-of-order HARQ transmission to transmit the first HARQ-ACK codebook and the second HARQ-ACK codebook. For example, the UE may transmit the second HARQ-ACK codebook before the first HARQ-ACK codebook in an event that the second priority is higher than the first priority. In an event that the first priority and the second priority are the same, the UE may be configured to apply the out-of-order HARQ restriction. In other words, the UE does not support out-of-order HARQ feedback within the HARQ feedbacks of the same priority.

In some implementations, the UE is not expected to receive a first PDSCH with the corresponding HARQ-ACK assigned to be transmitted in slot/sub-slot j, and a second PDSCH starting later than the first PDSCH with its corresponding HARQ-ACK assigned to be transmitted in a slot before slot/sub-slot j, in an event that the HARQ-ACKs of the two PDSCHs are associated with the same priority. The UE is expected to receive a first PDSCH with the corresponding HARQ-ACK assigned to be transmitted starting at symbol j, and a second PDSCH starting later than the first PDSCH with its corresponding HARQ-ACK assigned to be transmitted starting at symbol i (where i could be smaller than j), in an event that the HARQ-ACKs of the two PDSCHs associated with different priorities.

In some implementations, out-of-order HARQ between HARQ-ACK codebooks with different priorities is supported only within a slot. The UE may be configured to determine whether a first HARQ-ACK codebook and a second HARQ-ACK codebook are assigned in the same slot. In an event that the first HARQ-ACK codebook and the second HARQ-ACK codebook are assigned in the same slot, the UE may be configured to activate the out-of-order HARQ transmission to transmit the first HARQ-ACK codebook and the second HARQ-ACK codebook. In an event that the first HARQ-ACK codebook and the second HARQ-ACK codebook are assigned in different slots, the UE may be configured to apply the out-of-order HARQ restriction. Also, the UE may be configured to apply the out-of-order HARQ restriction within the HARQ-ACK codebooks of the same priority.

In some implementations, the UE is not expected to receive a first PDSCH with the corresponding HARQ-ACK assigned to be transmitted in slot j, and a second PDSCH starting later than the first PDSCH with its corresponding HARQ-ACK assigned to be transmitted in a slot before slot j. The UE is expected to receive a first PDSCH with the corresponding HARQ-ACK assigned to be transmitted starting at symbol j in slot n, and a second PDSCH starting later than the first PDSCH with its corresponding HARQ-ACK assigned to be transmitted starting at symbol i in slot n (where i<j), in an event that the HARQ-ACKs of the two PDSCHs associated with different priorities.

In some implementations, out-of-order HARQ between HARQ-ACK codebooks with different priorities is supported for all the UEs that support simultaneous construction of HARQ-ACK codebooks with different priorities. The network node may determine whether to schedule out-of-order HARQ transmission according to UE's capability. For example, the network node may schedule out-of-order HARQ transmission only for a group of UEs that can support simultaneous construction of HARQ-ACK codebooks with different priorities. The support of out-of-order HARQ between HARQ-ACK codebooks with different priorities may be indicated as UE capability. The UE may be configured to transmit a capability report to the network node to indicate whether the out-of-order HARQ transmission is supported in an event that the first priority and the second priority are different.

In some implementations, the out-of-order HARQ restriction that is applicable on the HARQ-ACK feedbacks of the same priority depends on the reported UE capability of the support out-of-order HARQ. This may be a separate UE capability from the one for of out-of-order HARQ between HARQ-ACK codebooks with different priorities. For example, in an event that the UE doesn't report the support of out-of-order HARQ, the out-of-order HARQ for the HARQ-ACK feedbacks of the same priority is not supported by the UE. In an event that the UE reports the support of out-of-order HARQ, the out-of-order HARQ for the HARQ-ACK feedbacks of the same priority is supported by the UE. The UE may be configured to transmit a capability report to the network node to indicate whether the out-of-order HARQ transmission is supported in an event that the first priority and the second priority are the same.

Illustrative Implementations

Figure 4:
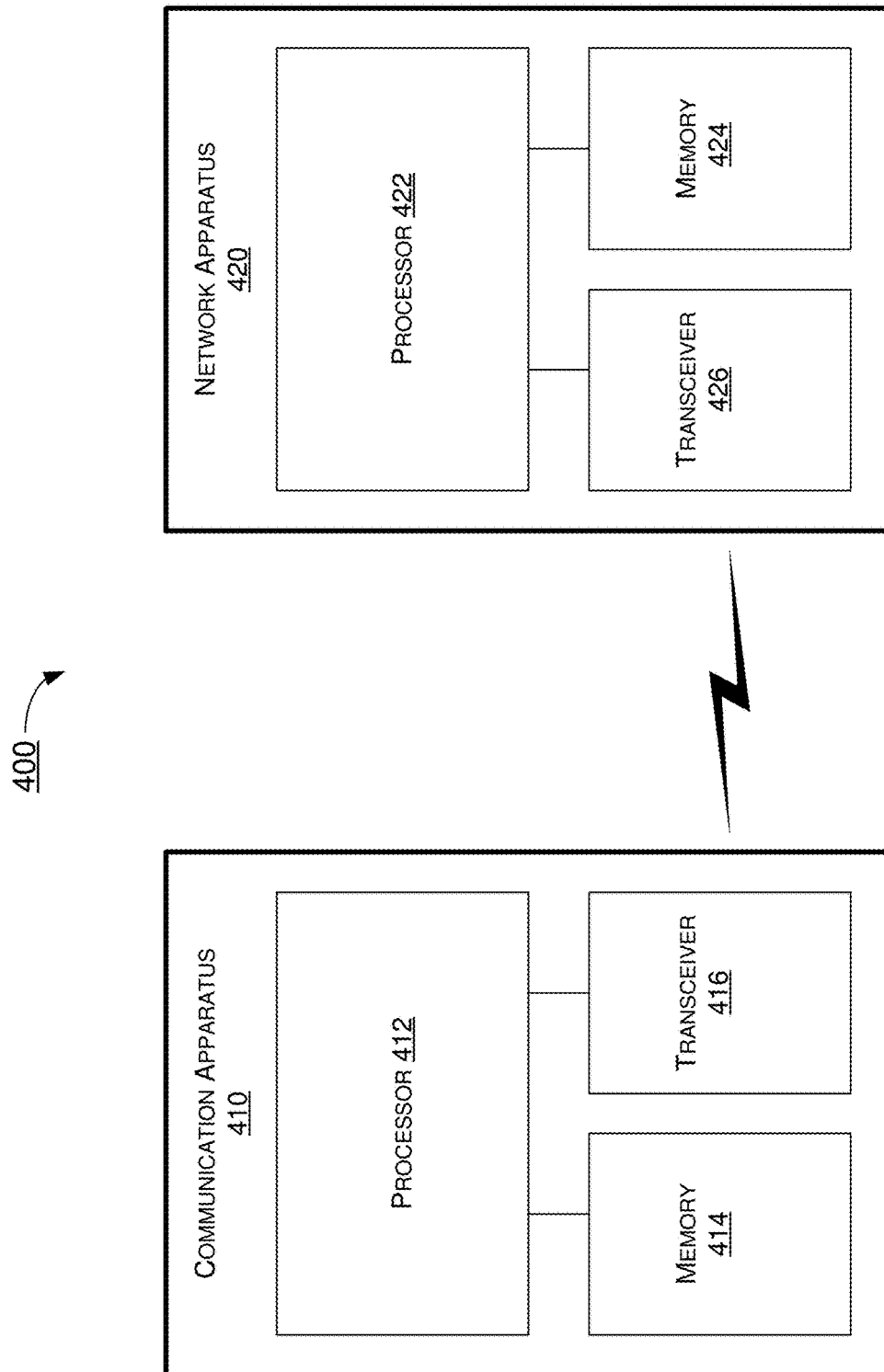
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to out-of-order HARQ feedback with respect to user equipment and network apparatus in wireless communications, including scenarios/schemes described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may receive, via transceiver 416, a first PDSCH in slot n and may be configured with a first PUCCH in slot n+3 for transmitting the HARQ feedback (e.g., A/N) corresponding to the first PDSCH. Processor 412 receive, via transceiver 416, a second PDSCH in slot n+1 and may be configured with a second PUCCH in slot n+2 for transmitting the HARQ feedback (e.g., A/N) corresponding to the second PDSCH. Processor 412 may be configured to construct/generate a first HARQ-ACK codebook corresponding to the first PDSCH. Processor 412 may be configured to construct/generate a second HARQ-ACK codebook corresponding to the second PDSCH received later than the first PDSCH. Then, processor 412 may be configured to determine a first priority associated with the first HARQ-ACK codebook and a second priority associated with the second HARQ-ACK codebook. The first PDSCH and the second PDSCH may be associated with different service types. For example, the first PDSCH may belong to the eMBB services and the second PDSCH may belong to the URLLC services. Processor 412 may determine that the second priority is higher than the first priority according to the service types. Processor 412 may also determine the first priority and the second priority according to an indication from the network node. Processor 412 may receiver, via transceiver 416, the indication via a DCI or a higher layer signaling (e.g., RRC signaling).

In some implementations, processor 412 may be configured to determine whether the first priority associated with the first HARQ-ACK codebook and the second priority associated with the second HARQ-ACK codebook are different. In an event that the first priority and the second priority are different, processor 412 may be configured to activate an out-of-order HARQ transmission to transmit the first HARQ-ACK codebook and the second HARQ-ACK codebook. For example, processor 412 may transmit, via transceiver 416, the second HARQ-ACK codebook before the first HARQ-ACK codebook in an event that the second priority is higher than the first priority. In an event that the first priority and the second priority are the same, processor 412 may be configured to apply the out-of-order HARQ restriction. In other words, processor 412 does not support out-of-order HARQ feedback within the HARQ feedbacks of the same priority.

In some implementations, processor 412 is not expected to receive a first PDSCH with the corresponding HARQ-ACK assigned to be transmitted in slot/sub-slot j, and a second PDSCH starting later than the first PDSCH with its corresponding HARQ-ACK assigned to be transmitted in a slot before slot/sub-slot j, in an event that the HARQ-ACKs of the two PDSCHs are associated with the same priority.

In some implementations, processor 412 is expected to receive a first PDSCH with the corresponding HARQ-ACK assigned to be transmitted starting at symbol j, and a second PDSCH starting later than the first PDSCH with its corresponding HARQ-ACK assigned to be transmitted starting at symbol i (where i could be smaller than j), in an event that the HARQ-ACKs of the two PDSCHs associated with different priorities.

In some implementations, processor 412 may be configured to determine whether a first HARQ-ACK codebook and a second HARQ-ACK codebook are assigned in the same slot. In an event that the first HARQ-ACK codebook and the second HARQ-ACK codebook are assigned in the same slot, processor 412 may be configured to activate the out-of-order HARQ transmission to transmit the first HARQ-ACK codebook and the second HARQ-ACK codebook. In an event that the first HARQ-ACK codebook and the second HARQ-ACK codebook are assigned in different slots, processor 412 may be configured to apply the out-of-order HARQ restriction. Also, processor 412 may be configured to apply the out-of-order HARQ restriction within the HARQ-ACK codebooks of the same priority.

In some implementations, processor 412 is not expected to receive a first PDSCH with the corresponding HARQ-ACK assigned to be transmitted in slot j, and a second PDSCH starting later than the first PDSCH with its corresponding HARQ-ACK assigned to be transmitted in a slot before slot j.

In some implementations, processor 412 is expected to receive a first PDSCH with the corresponding HARQ-ACK assigned to be transmitted starting at symbol j in slot n, and a second PDSCH starting later than the first PDSCH with its corresponding HARQ-ACK assigned to be transmitted starting at symbol i in slot n (where i<j), in an event that the HARQ-ACKs of the two PDSCHs associated with different priorities.

In some implementations, processor 422 may determine whether to schedule out-of-order HARQ transmission according to the capability of communication apparatus 410. For example, processor 422 may schedule out-of-order HARQ transmission only for a group of communication apparatus that can support simultaneous construction of HARQ-ACK codebooks with different priorities. Processor 412 may be configured to transmit, via transceiver 416, a capability report to network apparatus 420 to indicate whether the out-of-order HARQ transmission is supported in an event that the first priority and the second priority are different.

In some implementations, in an event that communication apparatus 410 doesn't report the support of out-of-order HARQ, processor 422 may determine that the out-of-order HARQ for the HARQ-ACK feedbacks of the same priority is not supported by communication apparatus 410. In an event that communication apparatus 410 reports the support of out-of-order HARQ, processor 422 may determine that the out-of-order HARQ for the HARQ-ACK feedbacks of the same priority is supported by communication apparatus 410. Processor 412 may be configured to transmit, via transceiver 416, a capability report to network apparatus 420 to indicate whether the out-of-order HARQ transmission is supported in an event that the first priority and the second priority are the same.

Illustrative Processes

Figure 5:
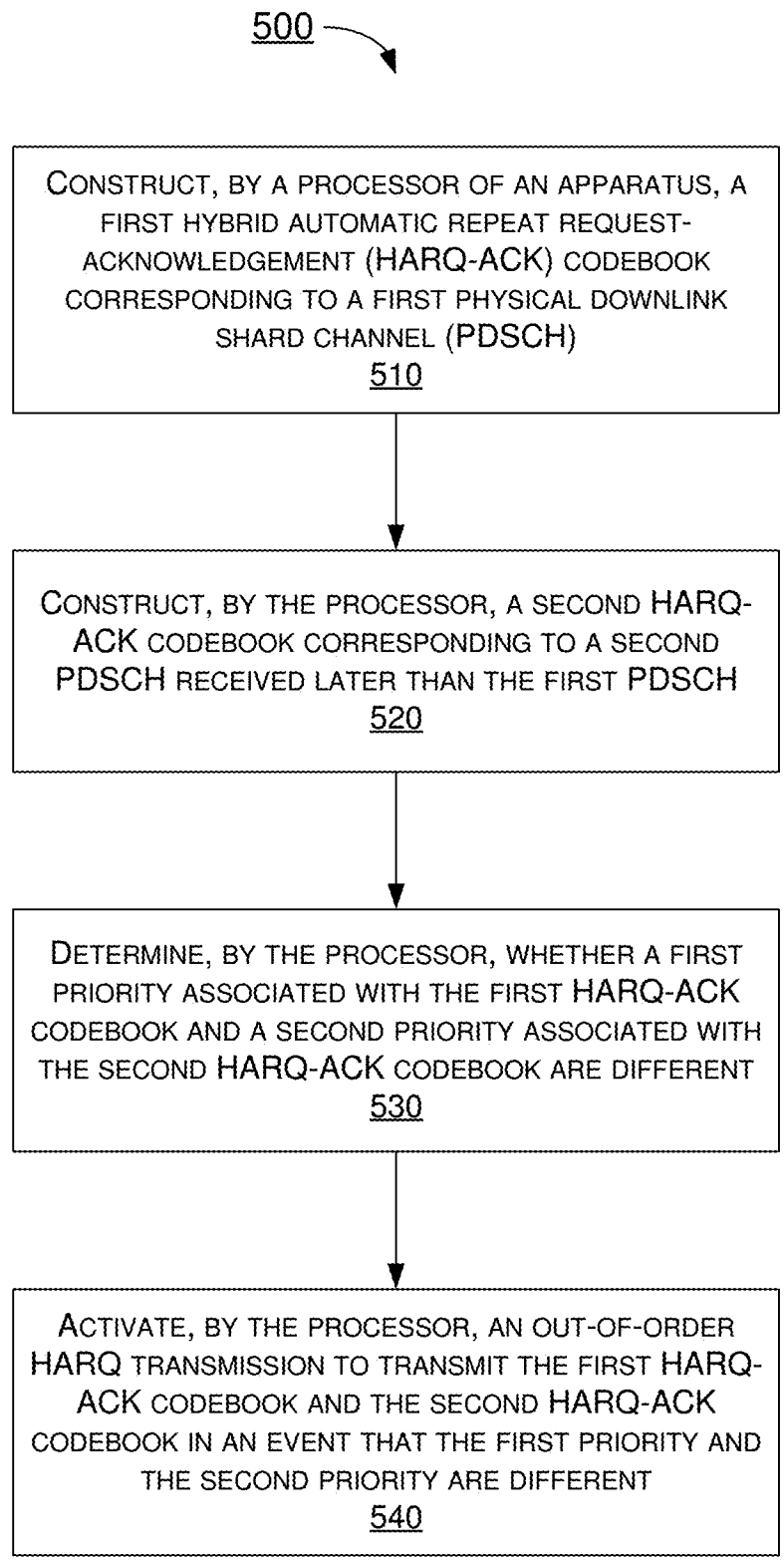
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to out-of-order HARQ feedback with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 510. Process 500 may begin at block 510.

At 510, process 500 may involve processor 412 of apparatus 410 constructing a first HARQ-ACK codebook corresponding to a first PDSCH. Process 500 may proceed from 510 to 520.

At 520, process 500 may involve processor 412 constructing a second HARQ-ACK codebook corresponding to a second PDSCH received later than the first PDSCH. Process 500 may proceed from 520 to 530.

At 530, process 500 may involve processor 412 determining whether a first priority associated with the first HARQ-ACK codebook and a second priority associated with the second HARQ-ACK codebook are different. Process 500 may proceed from 530 to 540.

At 540, process 500 may involve processor 412 activating an out-of-order HARQ transmission to transmit the first HARQ-ACK codebook and the second HARQ-ACK codebook in an event that the first priority and the second priority are different.

In some implementations, process 500 may involve processor 412 transmitting the second HARQ-ACK codebook before the first HARQ-ACK codebook in an event that the second priority is higher than the first priority.

In some implementations, process 500 may involve processor 412 applying an out-of-order HARQ restriction in an event that the first priority and the second priority are the same.

In some implementations, the first PDSCH and the second PDSCH may be associated with different service types.

In some implementations, process 500 may involve processor 412 determining the first priority and the second priority according to an indication from a network node or the service types.

In some implementations, the service types may comprise at least one of eMBB and URLLC.

In some implementations, process 500 may involve processor 412 determining whether the first HARQ-ACK codebook and the second HARQ-ACK codebook are assigned in the same slot. Process 500 may further involve processor 412 activating the out-of-order HARQ transmission to transmit the first HARQ-ACK codebook and the second HARQ-ACK codebook in an event that the first HARQ-ACK codebook and the second HARQ-ACK codebook are assigned in the same slot.

In some implementations, process 500 may involve processor 412 applying an out-of-order HARQ restriction in an event that the first HARQ-ACK codebook and the second HARQ-ACK codebook are assigned in different slots.

In some implementations, process 500 may involve processor 412 transmitting a capability report to a network node to indicate whether the out-of-order HARQ transmission is supported in an event that the first priority and the second priority are different.

In some implementations, process 500 may involve processor 412 transmitting a capability report to a network node to indicate whether the out-of-order HARQ transmission is supported in an event that the first priority and the second priority are the same.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   constructing, by a processor of an apparatus, a first hybrid automatic repeat request-acknowledgment (HARQ-ACK) codebook corresponding to a first physical downlink shared channel (PDSCH);
   constructing, by the processor, a second HARQ-ACK codebook corresponding to a second PDSCH received later than the first PDSCH;
   determining, by the processor, whether a first priority associated with the first HARQ-ACK codebook and a second priority associated with the second HARQ-ACK codebook are different;
   determining, by the processor, the first priority and the second priority according to an indication from a network node in a downlink control information (DCI) or a radio resource control (RRC) signaling; and
   activating, by the processor, an out-of-order HARQ transmission to transmit the first HARQ-ACK codebook and the second HARQ-ACK codebook in an event that the first priority and the second priority are different.

2. The method of claim 1, further comprising:
   transmitting, by the processor, the second HARQ-ACK codebook before the first HARQ-ACK codebook in an event that the second priority is higher than the first priority.

3. The method of claim 1, further comprising:
   applying, by the processor, an out-of-order HARQ restriction in an event that the first priority and the second priority are the same.

4. The method of claim 1, wherein the first PDSCH and the second PDSCH are associated with different service types.

5. The method of claim 4, wherein the service types comprise at least one of enhanced mobile broadband (eMBB) and ultra-reliable low-latency communications (URLLC).

6. The method of claim 1, further comprising:
   determining, by the processor, whether the first HARQ-ACK codebook and the second HARQ-ACK codebook are assigned in the same slot; and
   activating, by the processor, the out-of-order HARQ transmission to transmit the first HARQ-ACK codebook and the second HARQ-ACK codebook in an event that the first HARQ-ACK codebook and the second HARQ-ACK codebook are assigned in the same slot.

7. The method of claim 1, further comprising:
   applying, by the processor, an out-of-order HARQ restriction in an event that the first HARQ-ACK codebook and the second HARQ-ACK codebook are assigned in different slots.

8. The method of claim 1, further comprising:
   transmitting, by the processor, a capability report to a network node to indicate whether the out-of-order HARQ transmission is supported in an event that the first priority and the second priority are different.

9. The method of claim 1, further comprising:
   transmitting, by the processor, a capability report to a network node to indicate whether the out-of-order HARQ transmission is supported in an event that the first priority and the second priority are the same.

10. An apparatus, comprising:
    a transceiver which, during operation, wirelessly communicates with a network node of a wireless network; and
    a processor communicatively coupled to the transceiver such that, during operation, the processor performs operations comprising:
       constructing a first hybrid automatic repeat request-acknowledgment (HARQ-ACK) codebook corresponding to a first physical downlink shared channel (PDSCH);
       constructing a second HARQ-ACK codebook corresponding to a second PDSCH received later than the first PDSCH;
       determining whether a first priority associated with the first HARQ-ACK codebook and a second priority associated with the second HARQ-ACK codebook are different;
       determining the first priority and the second priority according to an indication from a network node in a downlink control information (DCI) or a radio resource control (RRC) signaling; and
       activating an out-of-order HARQ transmission to transmit the first HARQ-ACK codebook and the second HARQ-ACK codebook in an event that the first priority and the second priority are different.

11. The apparatus of claim 10, wherein, during operation, the processor further performs operations comprising:
    transmitting, via the transceiver, the second HARQ-ACK codebook before the first HARQ-ACK codebook in an event that the second priority is higher than the first priority.

12. The apparatus of claim 10, wherein, during operation, the processor further performs operations comprising:
    applying an out-of-order HARQ restriction in an event that the first priority and the second priority are the same.

13. The apparatus of claim 10, wherein the first PDSCH and the second PDSCH are associated with different service types.

14. The apparatus of claim 13, wherein the service types comprise at least one of enhanced mobile broadband (eMBB) and ultra-reliable low-latency communications (URLLC).

15. The apparatus of claim 10, wherein, during operation, the processor further performs operations comprising:
    determining whether the first HARQ-ACK codebook and the second HARQ-ACK codebook are assigned in the same slot; and
    activating the out-of-order HARQ transmission to transmit the first HARQ-ACK codebook and the second HARQ-ACK codebook in an event that the first HARQ-ACK codebook and the second HARQ-ACK codebook are assigned in the same slot.

16. The apparatus of claim 10, wherein, during operation, the processor further performs operations comprising:
applying an out-of-order HARQ restriction in an event that the first HARQ-ACK codebook and the second HARQ-ACK codebook are assigned in different slots.

17. The apparatus of claim 10, wherein, during operation, the processor further performs operations comprising:
transmitting, via the transceiver, a capability report to the network node to indicate whether the out-of-order HARQ transmission is supported in an event that the first priority and the second priority are different.

18. The apparatus of claim 10, wherein, during operation, the processor further performs operations comprising:
transmitting, via the transceiver, a capability report to a network node to indicate whether the out-of-order HARQ transmission is supported in an event that the first priority and the second priority are the same.

* * * * *